(12) United States Patent
Guo et al.

(10) Patent No.: US 10,320,438 B2
(45) Date of Patent: Jun. 11, 2019

(54) WATERPROOF STRUCTURE AND MOBILE PHONE USING THE SAME

(71) Applicant: Power Idea Technology (Shenzhen) Co., Ltd., Shenzhen (CN)

(72) Inventors: Zhen-Yu Guo, Shenzhen (CN); Ji-Dong Ma, Shenzhen (CN); Fan-Guo Chen, Shenzhen (CN)

(73) Assignee: Power Idea Technology (Shenzhen) Co., Ltd., Shenzhen (CN)

( * ) Notice: Subject to any disclaimer, the term of this patent is extended or adjusted under 35 U.S.C. 154(b) by 254 days.

(21) Appl. No.: 15/245,220

(22) Filed: Aug. 24, 2016

(65) Prior Publication Data

US 2018/0062685 A1    Mar. 1, 2018

(51) Int. Cl.
| | |
|---|---|
| *H04B 1/3888* | (2015.01) |
| *H04B 10/40* | (2013.01) |
| *H04B 1/38* | (2015.01) |

(52) U.S. Cl.
CPC .......... *H04B 1/3888* (2013.01); *H04B 10/40* (2013.01); *H04B 2001/3894* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0053966 | A1* | 3/2010 | Tu ........................... | F21S 2/005 362/249.02 |
| 2012/0074153 | A1* | 3/2012 | Yang ....................... | H04M 1/18 220/694 |
| 2013/0070432 | A1* | 3/2013 | Kawai ................. | H05K 5/0052 361/752 |
| 2013/0335917 | A1* | 12/2013 | Sato ..................... | H04M 1/0252 361/679.58 |

FOREIGN PATENT DOCUMENTS

| | | | | | |
|---|---|---|---|---|---|
| CN | 201514217 U | * | 10/2012 | ............... | H05K 5/06 |
| CN | 202514217 U | | 10/2012 | | |
| CN | 202634516 U | * | 12/2012 | ............. | H04M 1/02 |
| CN | 202634516 U | | 12/2012 | | |
| CN | 103945024 A | * | 7/2014 | ............. | H04M 1/02 |
| EP | 2680546 A1 | * | 1/2014 | ............. | H04M 1/02 |
| JP | 2010081570 A | * | 4/2010 | ............. | H04M 1/02 |
| JP | 2010081570 A | * | 4/2010 | ............. | H04M 1/02 |

* cited by examiner

*Primary Examiner* — Zhitong Chen
(74) *Attorney, Agent, or Firm* — ScienBiziP, P.C.

(57) ABSTRACT

A waterproofing structure including a first casing, a waterproof pad, a second casing, and two pinch strips. Two first guide grooves and two second guide grooves are defined at either side of both casings. Each pinch strip is fitted and fastened to one first guide groove and one second guide groove to assemble and hold together the first and second casings, and so compressing the waterproofing pad between the two casings. Uniform pressure is applied to the waterproof pad at all points. The entire engagement section does not need screws, thus saving screwing time, and improving assembly efficiency. A mobile phone is also disclosed, the mobile phone has a complete sealing and waterproofing, and an assembly efficiency is improved.

12 Claims, 10 Drawing Sheets

WATERPROOF STRUCTURE AND MOBILE PHONE USING THE SAME

FIELD

The subject matter herein generally relates to a waterproof structure, and a mobile phone using the same.

BACKGROUND

In recent years, with the increase in people's outdoor activities, a variety of waterproof products (such as waterproof mobile phones) innovate and increase people's attention. The conventional waterproof structure of the waterproof mobile phone usually includes a first casing, soft rubber as the waterproof member, and a second casing. The second casing defines a groove, the soft rubber is assembled in the groove. The first casing and the second casing are assembled together with screws to press the waterproof soft rubber in the groove, and the waterproof soft rubber generates an extrusion deformation interference when pressed, the waterproof effect between the first casing and the second casing is accordingly achieved. In the aforementioned waterproof structure, the first casing is fixed to the second casing via a number of screws, the presence of screw fasteners requires a special space on the first casing and the second casing to allow for the screws, thus the sizes of the first casing and the second casing must be large. Simultaneously, the waterproof is achieved via that the soft rubber is pressed to be deformation interference by the locking force of the screws. That is, the waterproof structure is used such that, a number of points (namely, the positions where the screws are arranged) extrude the first casing and the second casing. Thus, the screws are required to be evenly distributed and the fastening force on the screws is required to be substantially the same. In that way, the deformation of the first casing and the second casing in the Y direction is controlled to be in a preset range and the waterproof soft rubber is ensured to generate an even deformation. However, because of manufacturing and assembly errors, the limitation of the casing structure, and non-uniform fastening forces, an even deformation of the waterproof soft rubber is difficult to achieve, reducing the waterproofing effect. In order to overcome the shortcoming of leaking and ensure a reliable waterproof effect, the only way is to arrange as many screws as possible between the first casing and the second casing to ensure the even exertion, for example if ten mobile phones are needed to be assembled, a substantial number of man-hours in a station of locking screws will be consumed, and consistency in the fastening of each screw is difficult to ensure, thus the waterproof effect is affected. Furthermore, in the waterproof manner that employs screws to fix the first casing and the second casing together, when the mobile phone has been used and knocked about for a long time, the locking force of the screws becomes smaller; if one or more screws become loose or are lost, the waterproof effect is lost anyway.

SUMMARY OF THE INVENTION

The present disclosure provides a waterproof structure capable of reducing the size of a casing, simultaneously resolving a shortcoming that the waterproof effect is poor because the waterproof soft rubber is deformed unevenly by a number of points and uneven fastening force generated by the screws fasteners between the first casing and the second casing. In the present disclosure, great amounts of screwing are no longer required, and the problem of uneven fastening force of the screws fasteners between the first casing and the second casing is avoided.

The present disclosure also provides a mobile phone using the waterproofing structure of the embodiment capable of resolving a shortcoming that a waterproof effect is lost because a number of points and the uneven pressure forces between the first casing and the second casing, reducing a size of the first casing and the second casing, and resolving a problem of redundant processing of a great mount of screwing.

A waterproof structure includes a first casing, a waterproof pad, and a second casing. The waterproof pad is arranged between the first casing and the second casing. Two first guide grooves are defined in the first casing at portions closing to opposite sides of the first casing. Two second guide grooves are defined in the second casing at portions closing to opposite sides of the second casing. The waterproof structure further includes two pinch strips. Each pinch strip is engaged with one of first guide grooves and one of the second guide grooves to assemble the first casing, the waterproof pad, and the second casing together.

A mobile phone using the waterproof structure as aforementioned.

In the waterproof structure of this disclosure, the first casing and the second casing each define at least one guide groove, the pinch strips engage with the guide grooves to lock the first casing to the second casing. As compared to the related art, a position for the casing locking screws is not needed, and a size of the guiding grooves is smaller than a size required for applying many screws fastener, thus a size of the casing is decreased. In the waterproof structure of the disclosure, the waterproof pad is deformed by an engagement between the pinch strips and the casing, and bears uniform pressure along the whole engagement length so as to produce a conforming fit across the engagement length between the first casing and the second casing, producing an even deformation. As compared to the manner in the related art that a number of screws locking at a number of positions to produce a number of forces, the forces on the casing are non-uniformly distributed across a length direction between the points, causing the waterproof pad to produce an uneven deformation. The waterproof effect provided by the disclosure is more reliable, and there is no existence of the problem that the waterproof effect is lost because of the screws fasteners becoming loose. The manner of engagement replaces the manner of fixing by screws fasteners, thus assembly is simpler. The waterproof structure of the present disclosure only needs the pinch strips to engage with the casing, as compared to the manner in the related art which require a number of screws to deform the soft rubber seal in the process of securing the casings, screwing time is saved and the assembly efficiency is improved. Simultaneously, in the related art, as much as possible to ensure the waterproof pad to be evenly deformed, the arrangement of the screws are required to be even and the locking force of the screws are required to be uniform, the disclosure preferably resolves this problem with a manner of engagement.

BRIEF DESCRIPTION OF THE DRAWINGS

Implementations of the present technology will now be described, by way of example only, with reference to the attached figures, wherein.

DETAILED DESCRIPTION

For the purpose, technical solutions, and advantages of the present disclosure will become apparent below in conjunction with the accompanying drawings and specific embodiments of the present disclosure to further illustrate a waterproof structure of the present disclosure and the mobile phone using the waterproof structure.

Embodiments of the present disclosure will be described with reference to the accompanying drawings.

Figure 1:
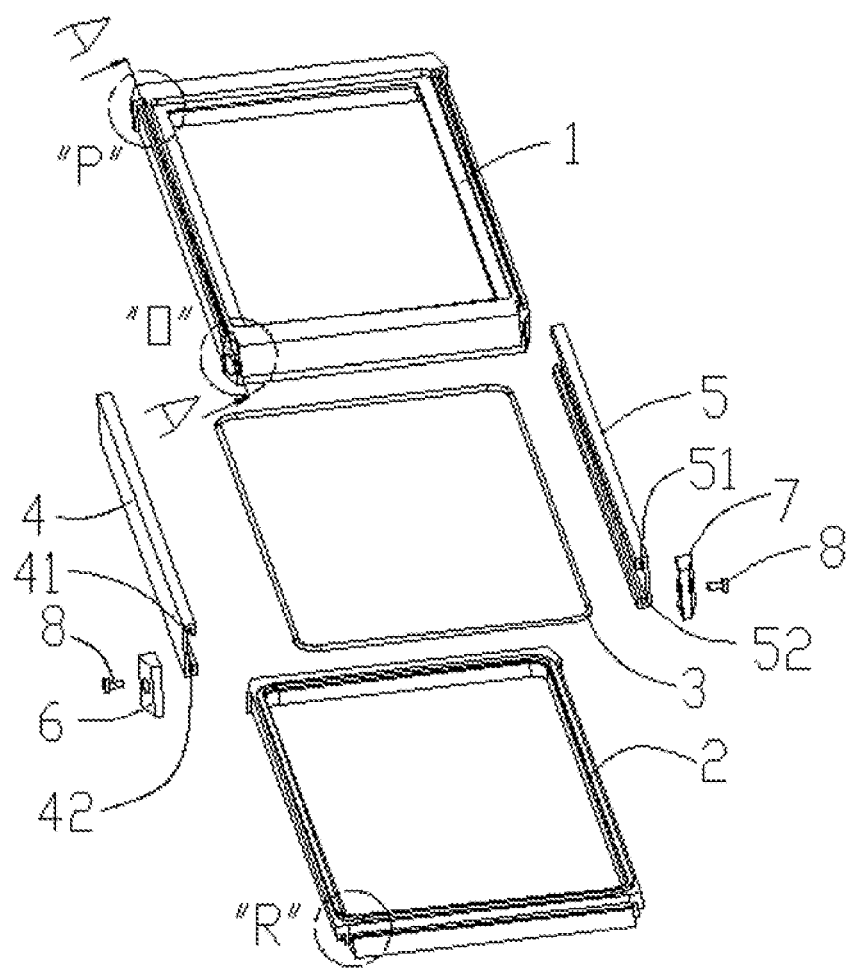
FIG. 1 illustrates an exploded view of an embodiment of a waterproof structure.
Figure 2:
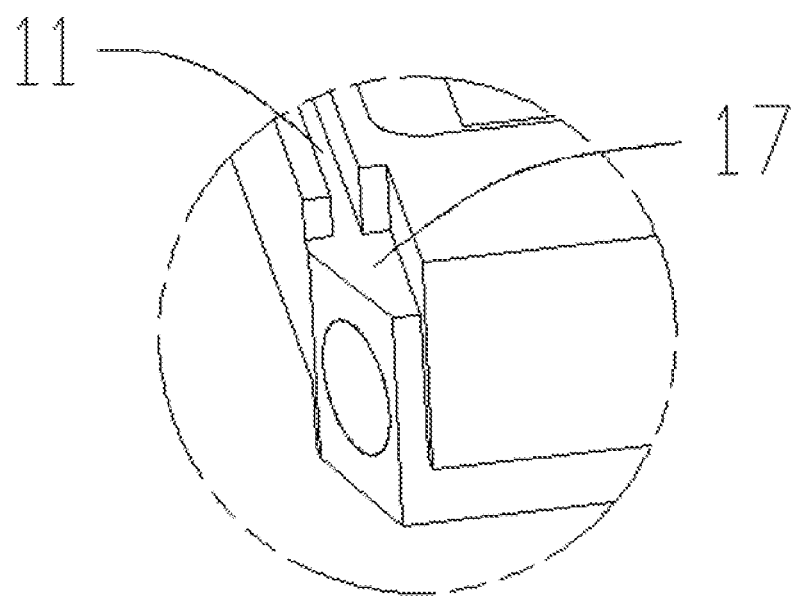
FIG. 2 illustrates a view of a portion "O" of FIG. 1.
Figure 3:
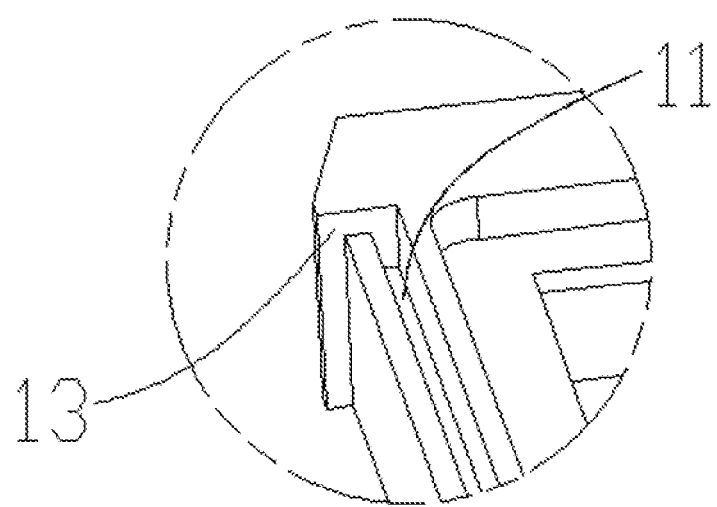
FIG. 3 illustrates a view of a portion "P" of FIG. 1.
Figure 4:
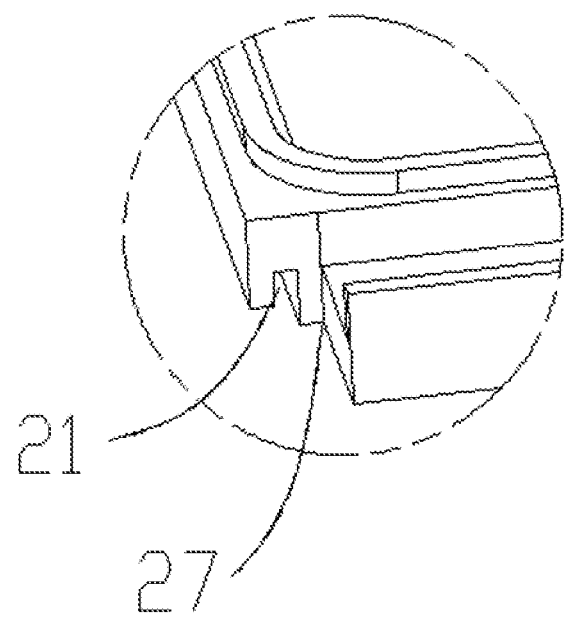
FIG. 4 illustrates a view of a portion "R" of FIG. 1.
Figure 5:
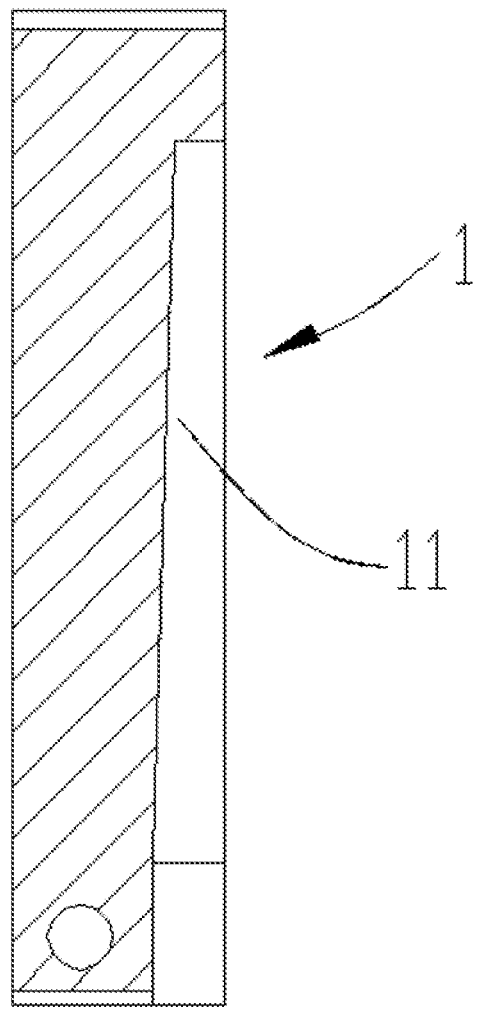
FIG. 5 illustrates a cross-sectional view taken along line A-A of FIG. 1.
Figure 6:
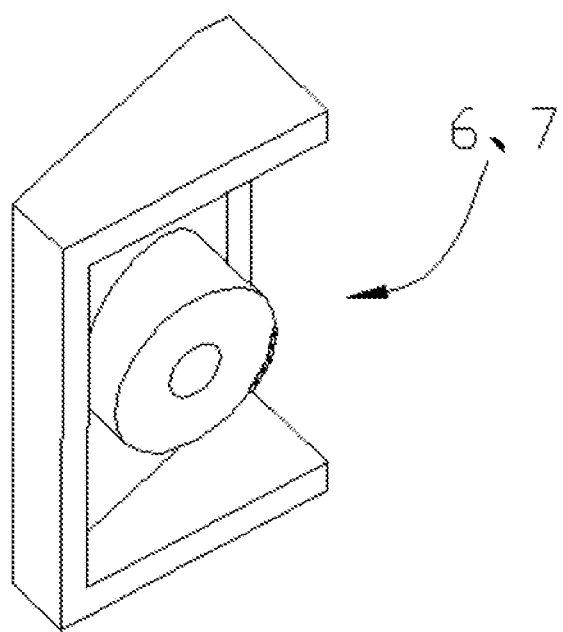
FIG. 6 illustrates an isometric view of an embodiment of a limit baffle in the structure of FIG. 1.
Figure 7:
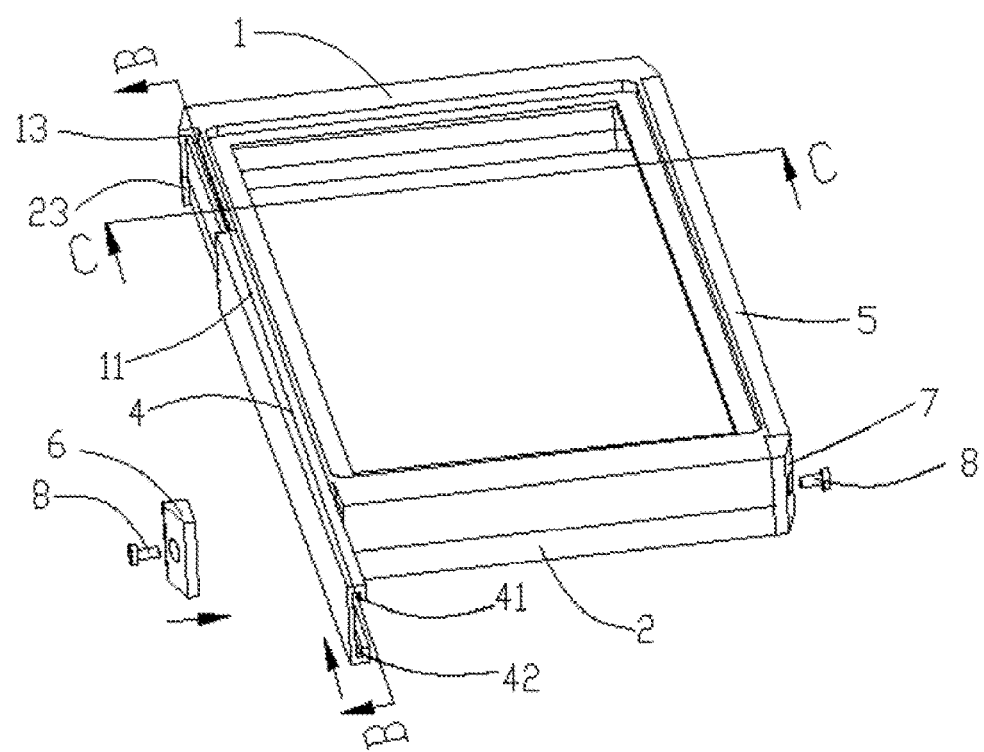
FIG. 7 illustrates a semi-assembled isometric view of an embodiment of a waterproof structure.
Figure 8:
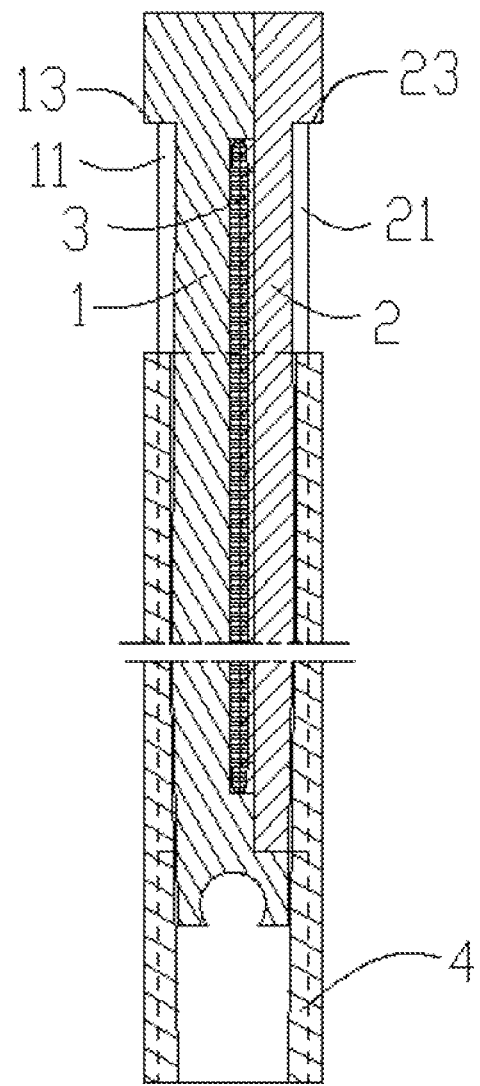
FIG. 8 illustrates a cross-sectional view taken along line B-B of FIG. 1.
Figure 9:
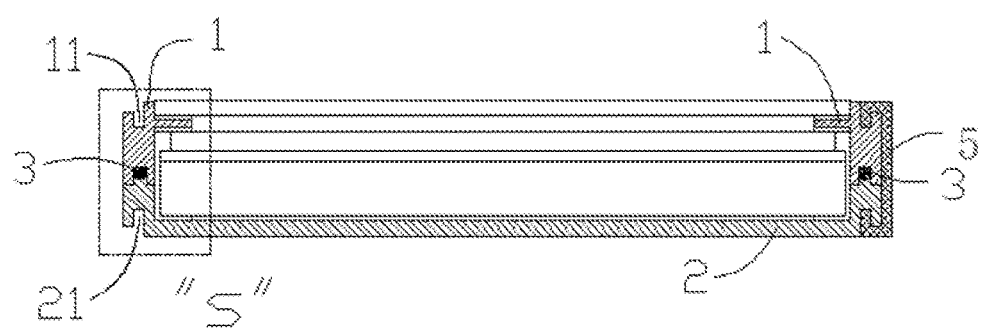
FIG. 9 illustrates a cross-sectional view taken along line C-C of FIG. 1.
Figure 10:
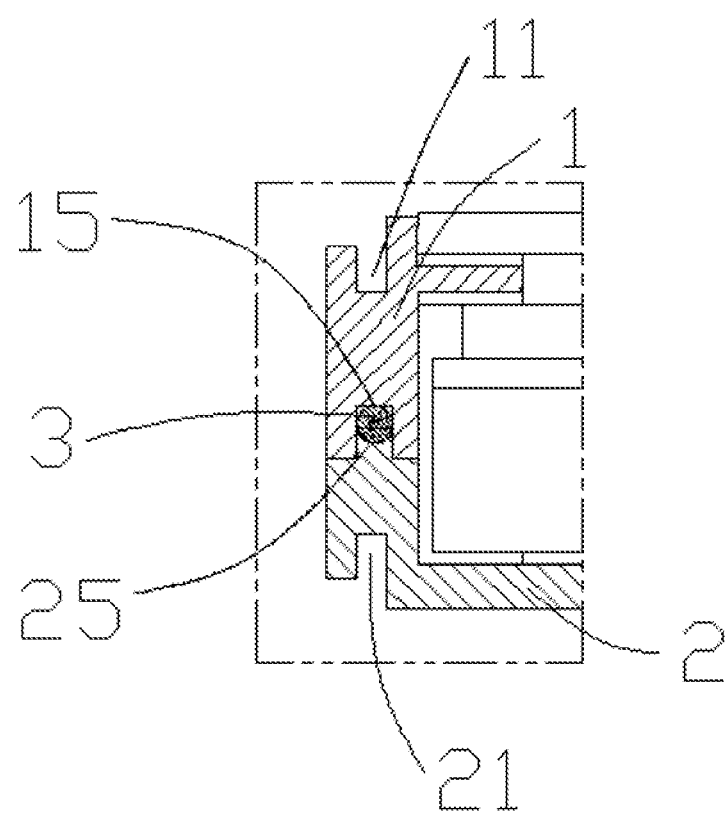
FIG. 10 illustrates a view of a portion "S" of FIG. 9.

Referring to FIGS. 1-10, a waterproof structure for a mobile phone casing is shown. The waterproof structure includes a first casing 1, a second casing 2, a waterproof pad 3, two symmetrically distributed pinch strips 4, 5, two symmetrically distributed limit baffles 6, 7, and two screws 8. The first casing 1 and the second casing 2 form the casing (not labeled). The waterproof pad 3 is arranged between the first casing 1 and the second casing 2. The pinch strips 4, 5 engage with both the first casing 1 and the second casing 2, thus the first casing 1, the second casing 2, the waterproof pad 3, and the pinch strips 4, 5 are assembled together. The limit baffles 6, 7 are fixed to the first casing 1 via the screws 8. In another embodiment, the limit baffles 6, 7 are fixed to the second casing 2 via the screws 8. Two first guide grooves 11, 12 are defined in the first casing 1 at portions adjacent to left and right sides of the first casing 1 and opposing each other. The first guide grooves 11, 12 each includes a first end and a second end. The first ends of the first guide grooves 11, 12 are each provided with a first limit stop 13 or 14, and the second ends of the first guide grooves 11. 12 are each provided with a first transferee space 17 or 18. The first casing 1 further defines a groove 15. The structure of second casing 2 is similar, having second guide grooves 21, 22 defined therein at portions adjacent to opposite left and right sides of the second casing 2 and opposing each other. The second guide grooves 21, 22 each includes a first end and a second end. The first ends of the second guide grooves 21, 22 are adjacent to the first ends of the first guide grooves 11, 12 and each of the first end of second guide grooves 21, 22 is provided with a second limit stop 23 or 24. The second ends of the second guide grooves 21, 22 are adjacent to the second ends of the first guide grooves 11, 12 and each of the second end of second guide grooves 21, 22 is provided with a second transferee space 27 or 28. The second casing 2 further includes a protrusion 25 corresponding to the groove 15. Pinch strips 4, 5 are each provided with two hooks, respectively hooks 41, 42, and hooks 51, 52. Such hooks engage with the first and second guide grooves on either side of the first casing 1 and the second casing 2. In at least one embodiment, the limit baffles 6, 7 are concave housing structures. The protrusion 25 presses the waterproof pad 3 in the groove 15. One end of the pinch strip 4 abuts and is limited by the first limit stop 13 and the second limit stop 23, and another end of the pinch strip 4 is fitted with the limit baffle 6. The limit baffle 6 is fixed to the first casing 1 and extends in the first transferee space 17 and the second transferee space 27 to fit with another end of the pinch strip 4. One end of the pinch strip 5 abuts and is limited by the first limit stop 14 and the second limit stop 24, and another end of the pinch strip 5 is fitted with the limit baffle 7. The limit baffle 7 is fixed to the first casing 1 and extends in the first transferee space 18 and the second transferee space 28 to fit with another end of the pinch strip 5. The engagement of the pinch strips 4, 5 assembles and holds the first casing 1 and the second casing 2 together. The waterproof pad 3 is crushed to a certain extent, thus achieving a sealing and waterproof between the first casing 1 and the second casing 2. In the waterproof structure, the press fit between the first casing 1 and the second casing 2 is achieved by the pinch strips 4, 5 both engaging with the first casing 1 and the second casing 2, and the first casing 1 and the second casing 2 bearing a uniform pressure across and along the engagement length, ensuring that the waterproof pad 3 bears the uniform force and is uniformly deformed, thus a better waterproof effect is achieved. The limit stops 6, 7 are respectively provided at two ends of the pinch strips 4, 5, preventing disengagement between the first and second casings 1 and 2 even after a long period of use, and accordingly the mobile phone can keep a better waterproof effect for a long time. Only the limit baffles 6, 7 are required to be fixed to the first casing 1 with the screws 8, the number of screws is thus reduced. Assembly of the first casing 1 and the second casing 2 only requires engagement of the pinch strip 4 with the first guide groove 11 and the second guide groove 21 and engagement of the pinch strip 5 with the first guide groove 12 and the second guide groove 22, thus screwing time is saved and the assembly efficiency is improved as compared to the related art. In addition, the waterproof effect of the related art is achieved by that a number of screw locking forces press fit a waterproof soft rubber at a number of points. Furthermore, because it is difficult to ensure that all screw locking forces are the same, it is also difficult to ensure that the screw locking forces exerted uniformly along the locking points of the screws. In contrast, the nearer to one locking point of a screw, the greater of the locking force of the screw exerted thereon, and the farther from the locking point of the screw, the less of the locking force of the screw exerted thereon. For the limitation of the casing structure, the even arrangement of the screw is difficult to achieve, thus the waterproof pad 3 is difficult to be evenly deformed, which affects the waterproof effect. In the present disclosure, the whole lateral surface of the pinch strips 4, 5 evenly engage and press fit on the first casing 1 and the second casing 2, thus ensuring even pressure on the waterproof pad 3 and the waterproof pad 3 is accordingly evenly deformed, achieving a better waterproof effect. The present disclosure, as compared to the related art, also does not need to provide positions for a number of screws fasteners between the first casing 1 and the second casing 2, only guide grooves 11, 12, 21, and 22 on the first and second casings 1 and 2 are required. The size of the guide grooves 11, 12, 21 and 22 is less than the size required to arrange a number of screws, thus a size of the casing is decreased, and accordingly a size of the mobile phone frame can be reduced.

Preferably, to ensure reliability and ease of assembly of the first casing 1 and the second casing 2, bottoms of the first guide grooves 11, 12 and bottoms of the second guide grooves 21, 22 of the present disclosure are sloped. Ends of the first guide grooves 11, 12 adjacent to the limit baffles 6, 7 are deeper than ends of the first guide grooves 11, 12 away from the limit baffles 6, 7. Correspondingly, ends of the second guide groove 21, 22 adjacent to the limit baffles 6, 7 are deeper than ends of the second guide groove 21, 22 away from the limit baffles 6, 7. Shapes of the two pinch strips 4, 5 correspond to those of the first guide grooves 11, 12 and the second guide grooves 21, 22. The pinch strips 4, 5 are pushed from the ends of the first guide grooves 11, 12 provided with the first transferee spaces 17, 18 and the second guide grooves 21, 22 provided with the second transferee spaces 27, 28 until the end of the pinch strip 4 abuts the first limit stop 13 and the second limit stop 23 and the end of the pinch strip 5 also abuts the first limit stop 14 and the second limit stop 24. When the pinch strips 4, 5 are fully engaged with the first guide grooves 11, 12 and the second guide grooves 21, 22, the pressure holding the first casing 1 and the second casing 2 together is the largest.

Alternatively, the first limit stop 13 and the second limit stop 23 are respectively provided at one end of the first casing 1 and one end of the second casing 2, and the first limit stop 14 and the second limit stop 24 are respectively provided at another end of the second casing 1 diagonally opposite to the one end of the first casing 1 and another end of the second casing diagonally opposite to the one end of the second casing 2. The first limit stop 13 and the second limit stop 23 are positioned in an opposing mirror image of each other, and the first limit stop 14 and the second limit stop 24 are positioned in an opposing mirror image of each other.

It will be appreciated that, the waterproof structure using the pinch strips 4, 5 is not limited to be applied to opposite sides of the first casing 1. A number of waterproof structures can be applied in one device, for example two such waterproof structures can be used in the first casing 1 if there are four sides. The first limit stops 13, 14 and the second limit stops 23, 24 are designed to be moveable according to requirements, and the limit baffles 6, 7 can be fixed. To ensure effective compromises between the functions of limiting and anti-releasing, the question of whether the limit stops and the limit baffles should be moveable or fixed can be varied and extended according to actual need.

In at least one embodiment, the first guide groove 12, the first limit stop 14, the first transferee space 18, the second guide groove 22, the second limit stop 24, the second transferee space 28 are respective symmetrical with the first guide groove 11, the first limit stop 13, the first transferee space 17, the second guide groove 21, the second limit stop 23, the second transferee space 27, and the label of the first guide groove 12, the first limit stop 14, the first transferee space 18, the second guide groove 22, the second limit stop 24, the second transferee space 28 are omitted and not shown in FIGS. 1-10.

The waterproofing structure can be used in various ways, such as in mobile phones, in tablet personal computers, and the like, the waterproof products with the waterproof structure can be varied and extended under the idea of the disclosure.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A waterproof structure comprising:
   a first casing comprising two opposite sides, two first guide grooves being defined in the first casing with one of the first guide grooves is defined at a portion of the first casing adjacent to one of the opposite sides of the first casing and the other of the first guide grooves is defined at another portion of the first casing adjacent to the other of the opposite sides of the first casing;
   a second casing comprising two opposite sides, two second guide grooves being defined in the second casing with one of the second guide grooves is defined at a portion of the second casing adjacent to one of the opposite sides of the second casing and the other of the second guide grooves is defined at another portion of the second casing adjacent to the other of the opposite sides of the second casing;
   a waterproof pad arranged between the first casing and the second casing; and
   two pinch strips engaged with the first guide grooves and the second guide grooves on either side of the first casing and the second casing to assemble the first casing, the waterproof pad, and the second casing together;
   a first limit stop provided at an end of each of the first guide grooves, a second limit stop provided at an end of each of the second guide grooves;
   each of the first guide grooves comprises a sloping bottom, and each of the second guide grooves comprises a sloping bottom, and an end of each of the first guide grooves adjacent to one of the first limit stops and one of the second limit stops are shallower than another end of each of the first guide grooves away from one of the first limit stops and one of the second limit stops, and an end of each of the second guide grooves adjacent to one of first limit stops and one of the second limit stops is shallower than another end of the second guide groove away from one of the first limit stops and one of the second limit stops, shapes of the pinch strips are corresponding to shapes of the first guide grooves and the second guide grooves.

2. The waterproof structure as described in claim 1, further comprising:
   wherein the ends provided with the second limit strops is adjacent to the ends provided with the first limit stops, each of the pinch strips engaged with one of the first limit stops and one of second limit stops.

3. The waterproof structure as described in claim 2, wherein: one of the first limit stops and one of the second limit stops are respectively provided at one end of the first casing and one end of the second casing, and the other of the first limit stops and the other of the second limit stops are respectively provided at another end of the first casing diagonally opposite to the one end of the first casing and another end of the second casing diagonally opposite to the one end of the second casing; and the one of the first limit stops and the one of the second limit stops are positioned in an opposing mirror image of each other, and the other of the first limit stops and the other of the second limit stops are positioned in an opposing mirror image of each other.

4. The waterproof structure as described in claim 2, wherein:
   the waterproof structure further comprises two limit baffles, each limit baffle fits with another end of one of the pinch strips and is fixed to the first casing or the second casing.

5. The waterproof structure as described in claim 4, wherein:
the another end of each of the first guide grooves is provided with a first transferee space, at the another end of each of the second guide grooves is provided with a second transferee space, wherein the another ends being provided with the first transferee spaces is adjacent to the another ends being provided with the second transferee spaces, each of the limit baffles is extended in one of the first transferee space and one of the second transferee space to fit with the another end of one of the pinch strips and is fixed to the first casing.

6. The waterproof structure as described in claim 5, wherein:
the first casing further defines a groove, the second casing further comprises a protrusion corresponding to the groove, the protrusion presses the waterproof pad in the groove.

7. A mobile phone comprising:
a waterproof structure comprising:
a first casing comprising two opposite sides, two first guide grooves being defined in the first casing with one of the first guide grooves is defined at a portion of the first casing adjacent to one of the opposite sides of the first casing and the other of the first guide grooves is defined at another portion of the first casing adjacent to the other of the opposite sides of the first casing;
a second casing comprising two opposite sides, two second guide grooves being defined in the second casing with one of the second guide grooves is defined at a portion of the second casing adjacent to one of the opposite sides of the second casing and the other of the second guide grooves is defined at another portion of the second casing adjacent to the other of the opposite sides of the second casing;
a waterproof pad arranged between the first casing and the second casing; and
two pinch strips engaged with the first guide grooves and the second grooves on either side of the first casing and the second casing to assemble the first casing, the waterproof pad, and the second casing together;
a first limit stop provided at an end of each of the first guide grooves, a second limit stop provided at an end of each of the second guide grooves;
each of the first guide grooves comprises a sloping bottom, and each of the second guide grooves comprises a sloping bottom, and an end of each of the first guide grooves adjacent to one of the first limit stops and one of the second limit stops are shallower than another end of each of the first guide grooves away from one of the first limit stops and one of the second limit stops, and an end of each of the second guide grooves adjacent to one of first limit stops and one of the second limit stops is shallower than another end of the second guide groove away from one of the first limit stops and one of the second limit stops, shapes of the pinch strips are corresponding to shapes of the first guide grooves and the second guide grooves.

8. The mobile phone as described in claim 7, further comprising:
wherein the ends provided with the second limit strops is adjacent to the ends provided with the first limit stops, each of the pinch strips engaged with one of the first limit stops and one of second limit stops.

9. The mobile phone as described in claim 8, wherein: one of the first limit stops and one of the second limit stops are respectively provided at one end of the first casing and one end of the second casing, and the other of the first limit stops and the other of the second limit stops are respectively provided at another end of the first casing diagonally opposite to the one end of the first casing and another end of the second casing diagonally opposite to the one end of the second casing; and the one of the first limit stops and the one of the second limit stops are positioned in an opposing mirror image of each other, and the other of the first limit stops and the other of the second limit stops are positioned in an opposing mirror image of each other.

10. The mobile phone as described in claim 8, wherein:
the waterproof structure further comprises two limit baffles, each limit baffle fits with another end of one of the pinch strips and is fixed to the first casing or the second casing.

11. The mobile phone as described in claim 10, wherein:
the another end of each of the first guide grooves is provided with a first transferee space, at the another end of each of the second guide grooves is provided with a second transferee space, wherein the another ends being provided with the first transferee spaces is adjacent to the another ends being provided with the second transferee spaces, each of the limit baffles is extended in one of the first transferee space and one of the second transferee space to fit with the another end of one of the pinch strips and is fixed to the first casing.

12. The mobile phone as described in claim 11, wherein:
the first casing further defines a groove, the second casing further comprises a protrusion corresponding to the groove, the protrusion presses the waterproof pad in the groove.

* * * * *

UNITED STATES PATENT AND TRADEMARK OFFICE
CERTIFICATE OF CORRECTION

PATENT NO. : 10,320,438 B2
APPLICATION NO. : 15/245220
DATED : June 11, 2019
INVENTOR(S) : Zhen-Yu Guo et al.

Page 1 of 1

It is certified that error appears in the above-identified patent and that said Letters Patent is hereby corrected as shown below:

On the Title Page

Please replace Item (30) regarding "Foreign Application Priority Data" with the following:
(30) Foreign Application Priority Data
Feb 24, 2014 (CN).......................... 201410061469.6

Signed and Sealed this
Tenth Day of December, 2019

Andrei Iancu
*Director of the United States Patent and Trademark Office*